June 21, 1955 — M. WATTER — 2,711,101
APPARATUS FOR CHANGING ROTARY MOTION TO RECIPROCATING MOTION
Filed Nov. 25, 1953 — 7 Sheets-Sheet 1

INVENTOR
Michael Watter
BY Maurice Q. Crewd
ATTORNEY

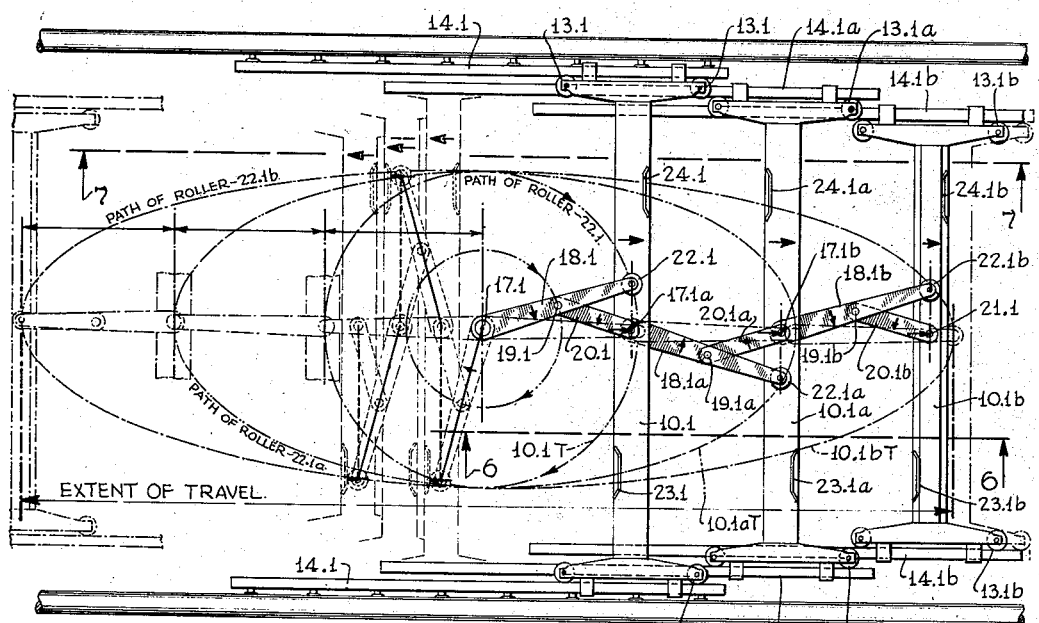
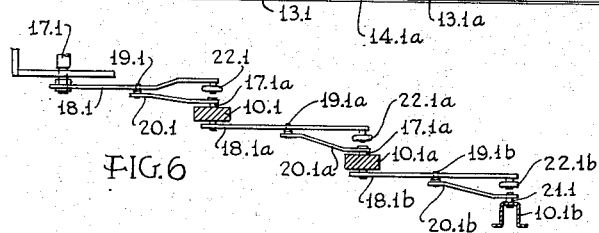
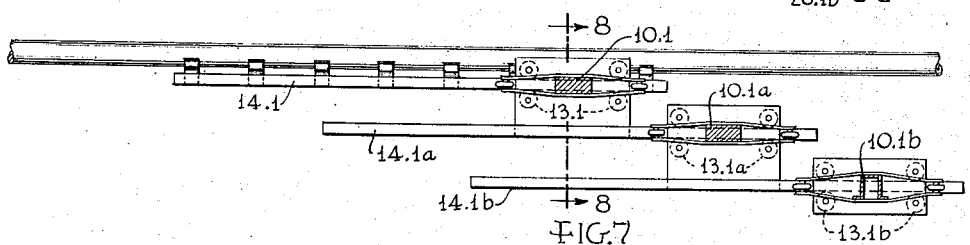
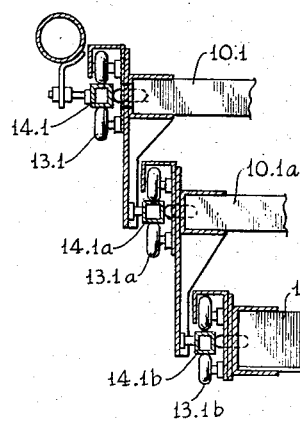

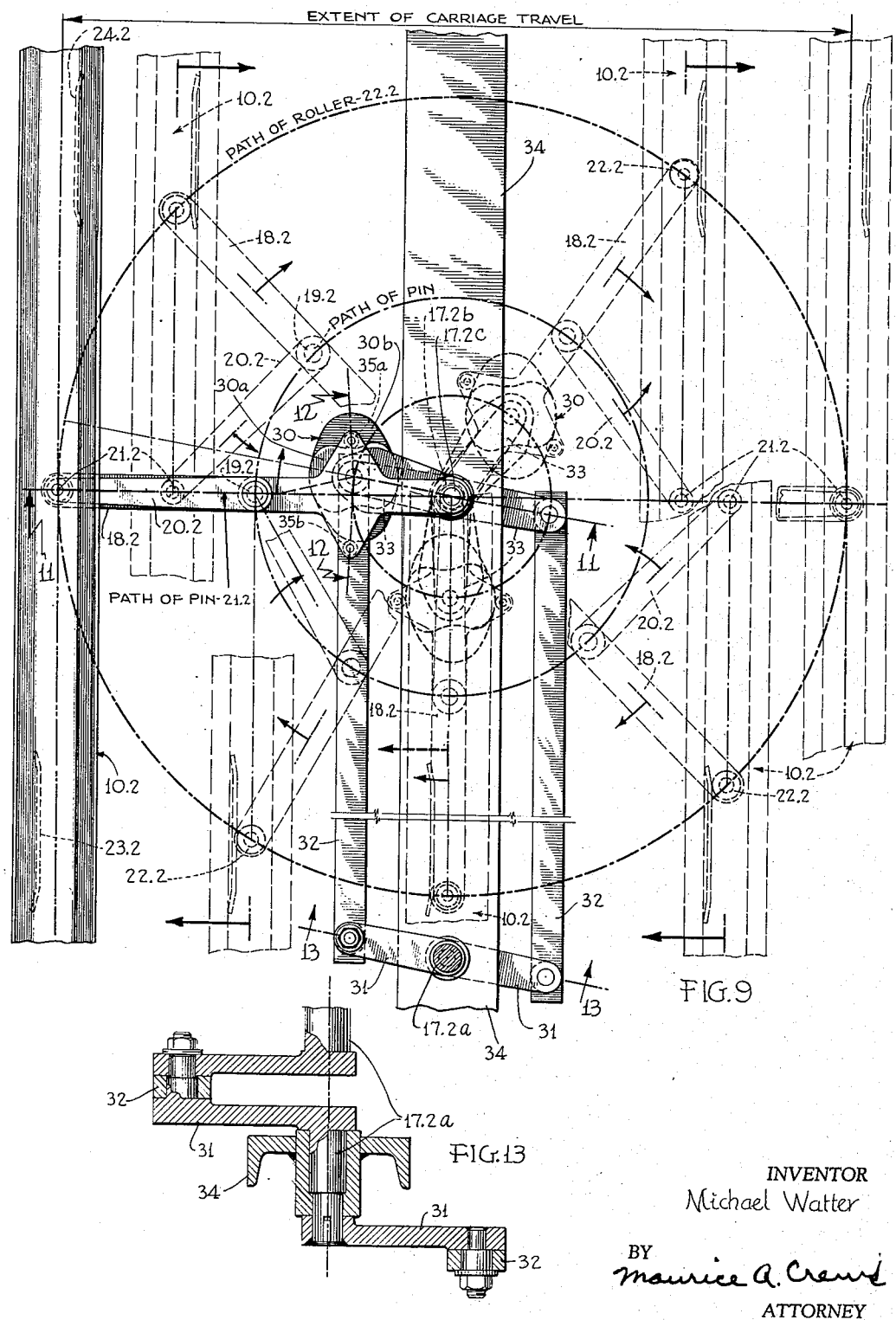

INVENTOR
Michael Watter

BY
Maurice A. Crews
ATTORNEY

June 21, 1955 M. WATTER 2,711,101
APPARATUS FOR CHANGING ROTARY MOTION
TO RECIPROCATING MOTION
Filed Nov. 25, 1953 7 Sheets-Sheet 5
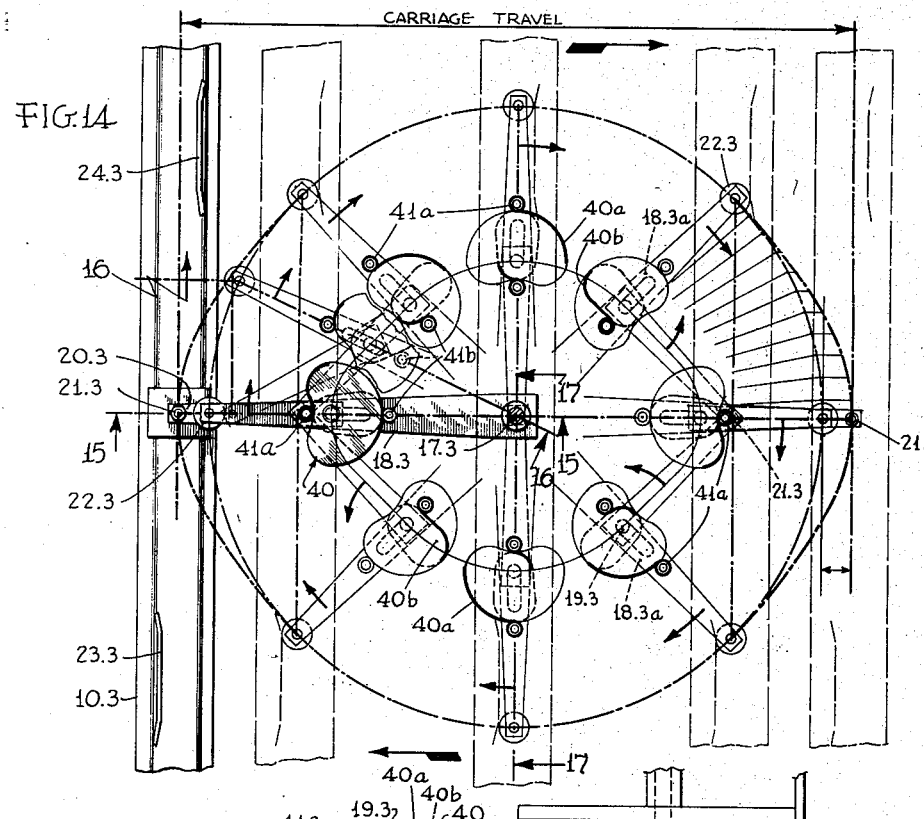
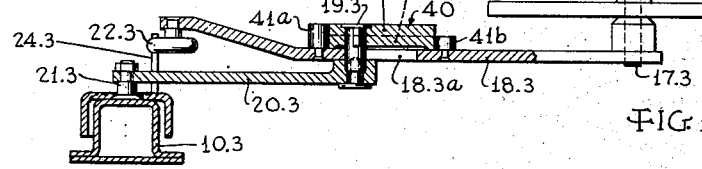
FIG.15
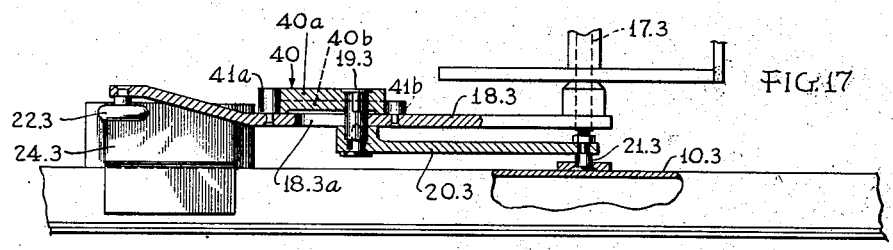
FIG.17
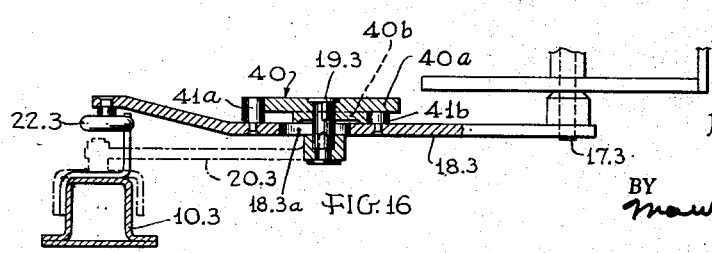
FIG.16
INVENTOR
Michael Watter
BY Maurice A. Crew
ATTORNEY

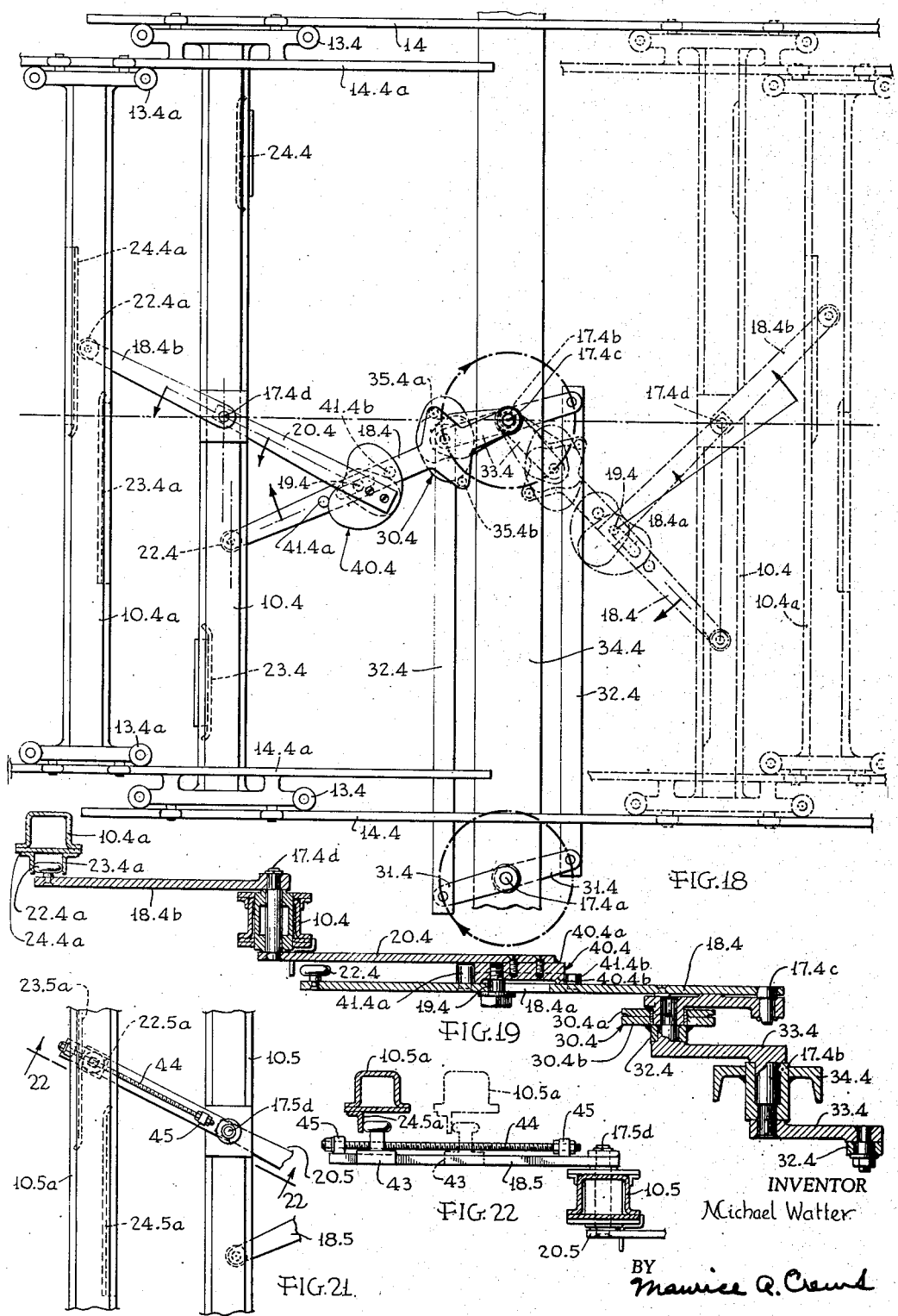

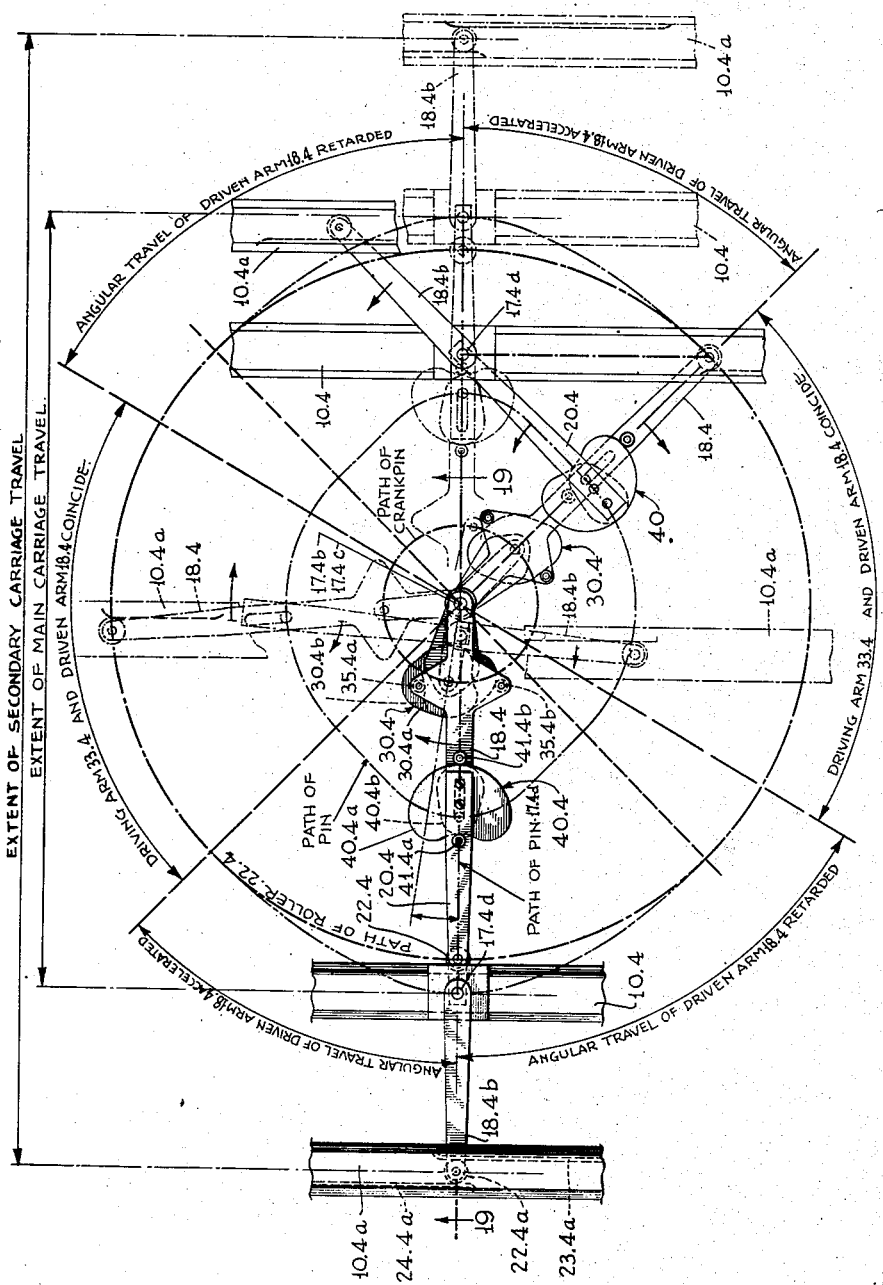

United States Patent Office 2,711,101
Patented June 21, 1955

2,711,101

APPARATUS FOR CHANGING ROTARY MOTION TO RECIPROCATING MOTION

Michael Watter, Philadelphia, Pa., assignor to The Budd Company, Philadelphia, Pa., a corporation of Pennsylvania Application November 25, 1953, Serial No. 394,397

19 Claims. (Cl. 74—27)

This invention relates to apparatus for changing rotary motion to reciprocating motion and has for an object the provision of improvements in this art.

The present application is a continuation-in-part of my copending application S. N. 304,579, filed August 15, 1952, now forfeited, that application being a division of my copending application S. N. 304,578, filed August 15, 1952.

One of the particular objects of the invention is to provide improved means for moving a reciprocating member from a position of rest at each end of its stroke by a crank and connecting rod and to move it past center position by a cam action.

Another object is to provide means for producing reciprocatory movement of relatively large amplitude by a relatively short crank and connecting rod, aided by the cam arrangement.

Another object is to provide means for imparting movement by the combined action of a crank and cam in such manner that the resultant movement of the reciprocating part is smooth and without jerks, shocks or noise throughout its full stroke.

Another object is to provide multiple or compound means for producing reciprocatory movement of a part, one carriage being carried by another carriage, whereby the amplitude of movement of a reciprocating part may be further increased by actuating mechanism which takes up relatively little space.

Another object is to alter the motion produced by the basic operating mechanism so as to provide delayed or accelerated movement at a desired point or points in the travel or to change the amplitude of movement, or both.

Another object is to place the prime mover clear of the reciprocating parts with improved means for driving the reciprocating parts from the prime mover.

The above and other objects of the invention will be apparent from the following description of certain exemplary embodiments, reference being made to the accompanying drawings, wherein:

Fig. 5 is a plan view of a modified or compound mechanism for multiplying the amplitude of reciprocatory movement, simple harmonic motion being produced;

Fig. 6 is a longitudinal vertical section and elevation taken on the line 6—6 of Fig. 5;

Fig. 7 is a longitudinal vertical section and elevation taken on the line 7—7 of Fig. 5;

Fig. 8 is an enlarged transverse vertical section and elevation taken on the line 8—8 of Fig. 7 with the carriages in a central position;

Fig. 9 is a diagrammatic plan view of another modified carriage operating mechanism in which the prime mover is located at one side of the carriage, a motion modifying element being introduced in the drive system for changing the angular velocity of the carriage moving arm near the ends of the carriage stroke;

Fig. 13 is an enlarged vertical section take on the line 13—13 of Fig. 9;

Fig. 14 is a diagrammatic plan view of another modified carriage operating mechanism in which a motion modifying element is introduced in the drive system for changing the linear velocity of the carriage near each end of its stroke while the angular velocity of the carriage operating arm is kept constant;

Fig. 15 is a vertical section taken on the line 15—15 of Fig. 14;

Fig. 16 is a vertical section similar to Fig. 15 but taken on the line 16—16 of Fig. 14 where the parts are in a different position;

Fig. 17 is a vertical section like Figs. 15 and 16 but taken on the line 17—17 of Fig. 14 where the parts are in still another position;

Fig. 18 is a plan view of another modified carriage operating mechanism in which a plurality of carriage motion modifying elements have been introduced;

Fig. 19 is a vertical section taken on the line 19—19 of Fig. 20;

Fig. 20 is a diagram illustrating the motions produced by the mechanism shown in Figs. 18 and 19;

Fig. 21 is a plan view of a portion of the mechanism shown in Fig. 18 showing another carriage movement modiflying element for adjusting the length of stroke of the carriage; and Fig. 22 is a vertical section taken on the line 22—22 of Fig. 21.

Figure 1:
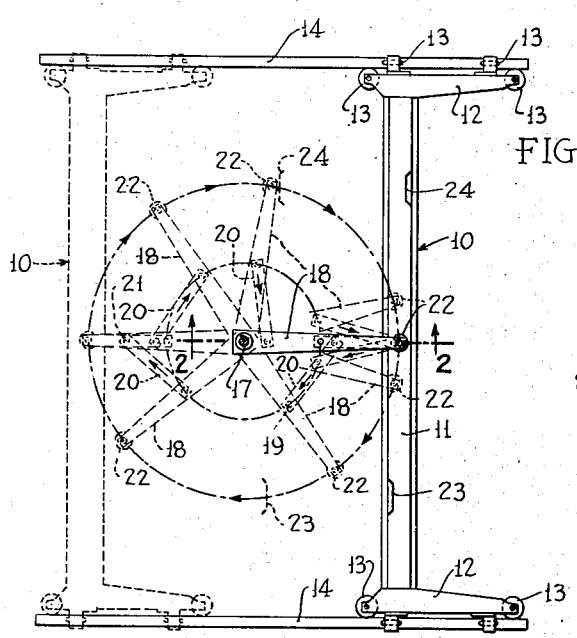
Fig. 1 is a top plan view of a simple or one-stage operating means for a reciprocating part.
Figure 2:
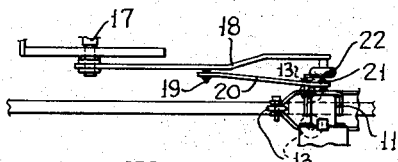
Fig. 2 is an elevation and section of parts shown in Fig. 1, the section being taken on the line 2—2 of Fig. 1.

The simple embodiment, comprising only one moving carriage, is shown in Figs. 1–4.

The part to be moved or driven is a carriage generally designated by the numeral 10 which comprises a cross bar 11, side pieces 12, and rollers 13 which operate on tracks 14.

The driving member is a shaft 17 mounted in suitable bearings to turn about a fixed center. To the shaft 17 there is secured a combination crank and cam arm 18. At a point 19 along the arm 18 there is pivoted one end of a connecting rod 20, the other end of the connecting rod being pivoted at 21 to the center of the cross bar 11.

The outer end of the arm 18 carries a cam roller 22 which is adapted to cooperate with cam plates 23 and 24 carried on the bar 11.

The portion of the arm 18 between the center of shaft 17 and the pivot point 19 of the connecting rod may be referred to as the crank arm and the full length of the arm from the shaft center to the center of the cam roller 22 may be referred to as the cam arm. The part of the arm beyond the pivot 19 toward the cam roller may be referred to as the arm extension.

Figure 3:
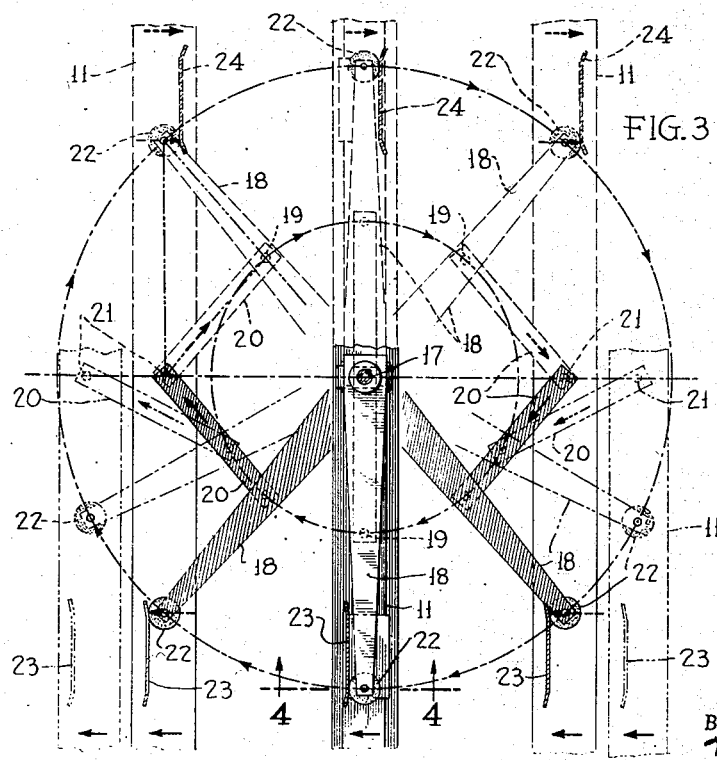
Fig. 3 is an enlarged and more diagrammatic plan view of some of the parts shown in Fig. 1.
Figure 4:
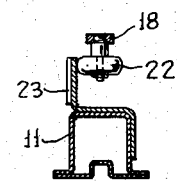
Fig. 4 is a vertical section taken on line 4—4 of Fig. 3.

The connecting rod, the crank arm and the arm extension are made of equal lengths. The geometry, therefore, is such that the rod-to-bar center 21 can pass through the axis of shaft 17 with the connecting rod 20 folded back on its crank arm as shown at the middle of Fig. 3. The connecting rod and its crank arm always form isoscles triangles across a connecting base of varying length, as shown in Fig. 3 and the same is true of the connecting rod and the arm extension, as shown by the chain lines in the upper left part of Fig. 3.

Also, since the cam arm is twice the length of the crank arm, the cam roller center travels twice the circumferential distance of that travelled by the crank center 19. This being the case, the cam plates 23 and 24 may have straight faces. The arm extension for the cam roller could be made of a different length from that shown but would require a complex cam shape and for this reason the one illustrated is preferred.

Since the cam roller is travelling at all times on the same radial line as the crank pin center, the angular speeds are the same and the cam roller will engage and leave its cam without shock or noise.

The carriage movement is equivalent to that which would be produced by the cam roller alone if it operated in a continuous tranverse slot but the disadvantages of a full transverse slot are completely avoided and, moreover, the advantages of having the positive action of a connecting rod to reverse the movements of the carriage at the ends of its stroke are obtained. The cam is only required to keep the carriage in motion near the center of its movement and the force required for this is not great. And while the cam action causes considerable carriage movement, the action occurs at such a point that the cams may be relatively short, hence are simple to make and easy to keep clean.

Both the connecting rod and cam mechanisms act in their most favorable zones and are inactive in the unfavorable zones where heavy wear would occur if either alone should be required to operate. And the connecting rod is relieved of duty at the center where it would have no effect at all, and past which it would not move except as the carriage momentum might carry it past this ineffective point.

In the compound carriage-on-carriage arrangement shown in the first modification of Figs. 5–8 the main driving or prime moving shaft which corresponds to shaft 17 in the simple form of Figs. 1–4 is designated as 17.1 and the auxiliary shafts of like character carried on carriages 10.1 and 10.1a are designated as 17.1a and 17.1b. Also the pin on the finally driven carriage 10.1b, which corresponds to the pivot pin 19 of the simple form but which in a further extended arrangement might correspond in action to the primary shaft 17.1, is designated as 21.1. The cam actuating end rollers of the operating levers 18.1, 18.1a and 18.1b are designated as 22.1, 22.1a and 22.1b. It is to be noted that the levers 18.1a and 18.1b are formed as effective extensions of the connecting rods 20.1 and 20.1a and that the final connecting rod 20.1b drives the final carriage 10.1b through the pivot pin 21.1. While the levers 18.1a and 18.1b are effectively rigid with the connecting rods 20.1 and 20.1a respectively the actual connections are through rigid axially spaced connections with shafts 17.1a and 17.1b respectively so as to provide passing movement of the carriages. The pivots of the connecting rods 20.1 etc. to the arms 18.1 etc. are designated as 19.1, 19.1a and 19.1b. The plate cams are designated at 23.1, 23.1a, 23.1b and 24.1, 24.1a and 24.1b.

The first carirage 10.1 has wheels 13.1 operating on a fixed track 14.1; the second carriage 10.1a has wheels 13.1a operating on a track 14.1a carried on carriage 10.1; and the third carriage 10.1b has wheels 13.1b operating on a track 14.1b carried by the carriage 10.1a.

On the right side of Fig. 5 in full lines and in Fig. 6 the parts are shown in a position just short of their fully extended position on that side and on the left side of Fig. 5 in broken lines the parts are shown in an intermediate position and in a fully extended position at that side of the main fixed-axis shaft 17.1, the tracks and wheels being omitted on the left side for simplicity.

The travel of parts is shown in broken lines in Fig. 5. The travel of the first carriage 10.1 will be the diameter of a circle 10.1T; the travel of the second carriage 10.1a will be the major diameter of the ellipse 10.1aT; and the travel of the third carriage 10.1b will be the major diameter of a longer ellipse 10.1bT.

The action of the compound arrangement shown in Figs. 5 to 8 will be clear from what has been said of the simple arrangement of Figs. 1 to 4.

In the second modification shown in Figs. 9 to 13 two material changes have been made to the simple one-carriage arrangement shown in Figs. 1 to 4. First, the prime moving drive shaft 17.2a has been spatially separated from the carriage drive shaft 17.2b to clear the vertical space above and below the zone of carriage movement; and second, a carriage motion changing element in the form of a cam unit 30 has been interposed in the carriage operating mechanism.

The driving shaft 17.2a is located at one side of the frame on which the carriage is mounted. This is indicated in Fig. 9 by breakage lines in the parts between shaft 17.2a and the carriage operating shaft 17.2b which it drives. This permits the prime mover, such as a motor, gearing and controls (not shown), to be located clear of the carriages and where they will easily accessible.

The shaft 17.2a is provided with cranks 31 which operate connecting rods 32 which at their other ends are connected with cranks 33 on the shaft 17.2b. One or more rigid frame members 34 carries bearings for the shafts 17.2a and 17.2b.

The crank-cam arm 18.2 is not rigidly secured to the shaft 17.2b, as in the prior embodiments, but is mounted, as on a short shaft 17.2c, to turn freely on the same axis as shaft 17.2b. The arm 18.2 carries cam follower elements 35a, 35b which engage the cam unit 30. To avoid using grooved cams the cam unit comprises an upper cam element 30a and a lower cam element 30b which engage separate cam follower elements 35a, 35b. As is known, the motion produced is the same as that which could be derived from a single cam and follower. The cam unit is rigidly secured to the inner end of one of the connecting rods 32.

Figure 10:
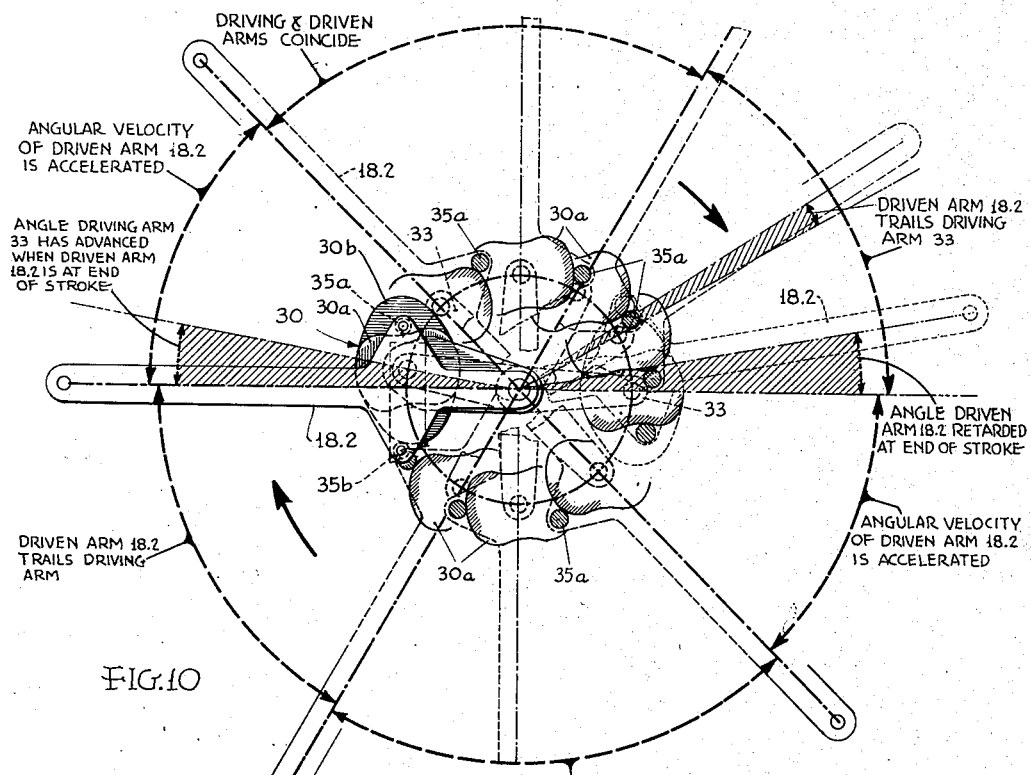
Fig. 10 is a diagram to illustrate the movements produced by the mechanism shown in Fig. 9.
Figure 11:
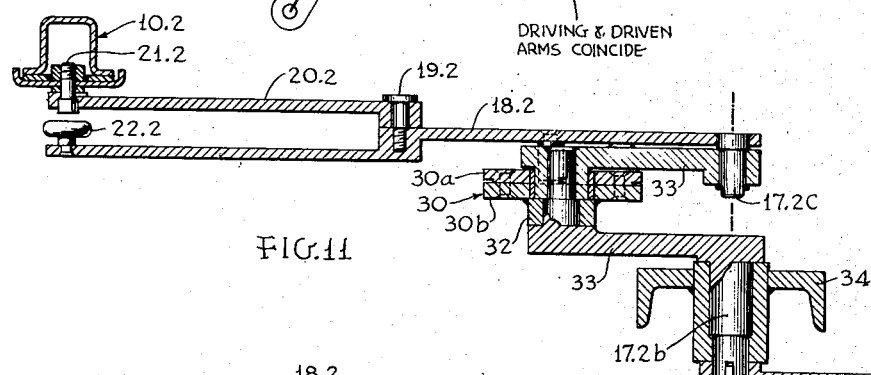
Fig. 11 is an enlarged vertical section taken on the line 11——11 of Fig. 9.
Figure 12:
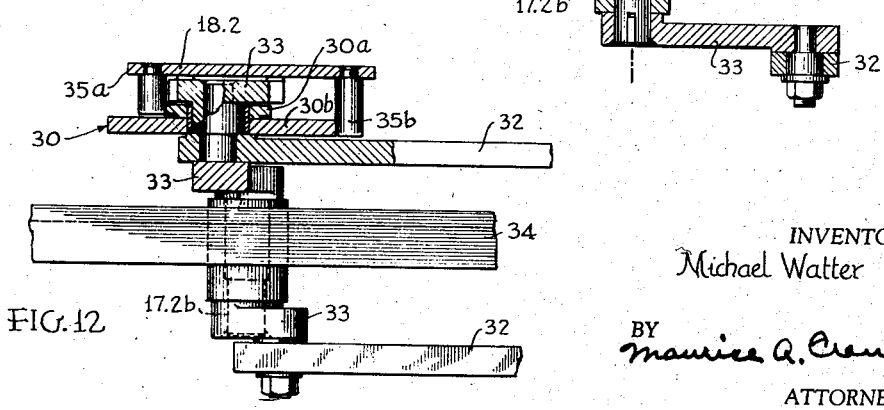
Fig. 12 is an enlarged vertical section taken on the line 12—12 of Fig. 9.

The cam unit can be made to produce a wide range of changes in the carriage movement. The particular cam unit illustrated herein, as shown in Fig. 10, causes a change in angular velocity of the driven arm 18.2 relative to the angular velocity of the driving arm 33 at each end of the carriage movement, the effect of which is to slow down the movement of the carriage as it nears each end of its stroke. The carriage is represented by the numeral 10.2, the connecting rod by 20.2, its pivot pins to arm 18.2 and carriage 10.2 respectively by 19.2 and 21.2, the carriage cams by 23.2 and 24.2 and the cam roller by 22.2.

The cranks 31, 33 and connecting rods 32 form a very simple and inexpensive driving connection for spaced shafts, which avoids backlash and loose motion and transmits motion from one shaft to another without change in angular velocity. The effect of chain or gear drive is realized but in a simpler sturdier form.

In the third modification shown in Figs. 14 to 17 the connecting rod 20.3 is connected to the carriage 10.3 by a pivot pin 21.3 but is not mounted on the arm 18.3 by a fixed pin as in the prior forms but is pivoted on a pin 19.3 which has sliding movement in a radial slot 18.3a formed in the arm. A cam 40, comprising the parts 40a, 40b which cooperate respectively, with the followers 41a, 41b secured to the arm 18.3, is rigidly secured to the pin 19.3 so that the carriage 10.3 is moved a greater distance than it would be by the simple pivot pin of the prior forms.

This action is fully analyzed in Fig. 14. The action of the arm 18.3 itself and the action of its cam roller 22.3 on the cams 23.3 and 24.3 are not affected by this cam action. The shaft 17.3 is arranged above the carriage, as in the first form (Figs. 1–4) and second form (Figs. 5–8), rather than beneath the carriage, as in the third form (Figs. 9–13).

In the fifth form (fourth modification) shown in Figs. 18 to 20 the effects of the third and fourth forms are combined to ease the action at each end of the stroke, as in the third form of Figs. 9 to 13, but at the same time to provide an extended carriage stroke, as in the fourth form of Figs. 14 to 17. Also a compound carriage-on-carriage arrangement is provided, as in the second form of Figs. 5 to 8, the second carriage 10.4a being actuated entirely by cam action. When the first carriage 10.4 is operated by the combined action of connecting rod and cam it is feasible to use a simple cam action on the second or subsequent carriages in the group because the major reversal and past-center loads have already been taken by the first carriage.

In Figs. 18 to 20 the drive shaft 17.4a is at one side, as in the third form of Figs. 9 to 13, and drives shaft 17.4b through cranks 31.4, 33.4 and connecting rods 32.4. A frame member 34.4 carries the shafts 17.4a, 17.4b, as before. The cam 30.4, comprising parts 30.4a and 30.4b, is rigidly secured to one of the connecting rods 32.4 and actuates the cam followers 35.4a and 35.4b carried by arm 18.4 pivoted on shaft part 17.4c. This produces an action like that of Figs. 9 to 13.

The cam roller 22.4 acts upon the carriage cams 23.4 and 24.4 as in the prior forms. The connecting rod 20.4 carries a pivot pin 19.4 which slides in a slot 18.4a of arm 18.4 and also carries a cam unit 40.4, comprising the parts 40.4a and 40.4b, which cooperates with the cam followers 41.4a and 41.4b secured to the arm 18.4. This produces an action like that of Figs. 14 to 17.

The connecting rod 18.4 is rigid with a pivot pin shaft 17.4d mounted on the first carriage 10.4 and, through the shaft, is rigid with an arm 18.4b which carries a cam roller 22.4a.

The cam roller 22.4a operates the second carriage 10.4a by engagement with elongated cam plates 23.4a and 24.4a. In this case the usual connecting rod operation is dispensed with because the first carriage movement is reversed by a connecting rod and the second carriage does not impose so much load or shock in reversing direction. The cam plates overlap at the center to avoid separation from the cam roller 22.4a at the ends of the stroke.

The first carriage 10.4 has wheels 13.4 which move on fixed tracks 14.4 and the second carriage 10.4a has wheels 13.4a which move on the tracks 14.4a carried by the first carriage 10.4.

Fig. 20 shows diagrammatically the effects produced by combining the two cam actions. The legends on the figure together with the prior description of the separate cam actions will make the effects clear without further description. In the particular embodiment illustrated the stroke of the second carriage is lengthened and the movement of both carriages is slowed toward each end of the stroke and then accelerated after the end of the stroke has been passed. The specific cam shapes are given only by way of example and it is to be understood that various other cam shapes can be provided to change the carriage motion in various other ways.

Figs. 21 and 22 show a modification of a part of the mechanism illustrated in Figs. 18–20, namely means for adjusting the effective length of the cam arm 18.5b. The cam roller 22.5a is carried by a slide 43 mounted on arm 18.5b and adjusted by a screw 44 which is turnably mounted in brackets 45 secured to the arm 18.5b. Locknuts on the screw 44 hold the parts in adjusted position. It may be assumed that the mechanism shown in Figs. 21 and 22 is a part of that shown in Figs. 18 to 20 since it may be directly substituted for mechanisms shown in Figs. 18 to 20.

It is thus seen that the invention provides simple and efficient means for converting rotary movement into reciprocatory movement by crank and connecting rod and cam actions, provides simple and effective means for altering the normal movement in various ways, provides simple and convenient means for altering the length of stroke of one or all carriages of a simple or compound installation, and provides simple and effective means for driving from a prime moving shaft located clear of the path of carriage travel. While certain embodiments have been disclosed by way of illustration, it is to be understood that there may be various other embodiments and modifications within the scope of the invention.

What is claimed is:

1. Means for translating rotary movement into reciprocatory movement, comprising in combination, a reciprocable member, a rotary shaft, a rotary arm carried by said shaft, a connecting rod pivoted at its ends to said reciprocable member and pivoted to said arm intermediate its length, cam means on said reciprocable member, and cam actuating means on said shaft engageable with said cam means for assisting the connecting rod in moving said reciprocable member past the axis of said shaft.

2. Means for translating rotary movement into reciprocatory movement, comprising in combination, a rotary shaft, a reciprocable part, a crank arm on said shaft, a connecting rod pivoted to said reciprocable part and to said crank arm, cam elements on said reciprocable part, and a cam arm associated with and actuated by said shaft for acting on said cam elements at times for assisting said connecting rod in moving said reciprocable part past the axis of said shaft.

3. Means for translating rotary movement into reciprocatory movement, comprising in combination, a rotary shaft, a reciprocable part, a crank arm on said shaft, a connecting rod pivoted to said reciprocable part and to said crank arm, cam elements on said reciprocable part, and a cam arm associated with and actuated by said shaft for acting on said cam elements at times for assisting said connecting rod in moving said reciprocable part past the axis of said shaft, said cam arm being carried by and forming an extension of said crank arm.

4. Means for translating rotary movement into reciprocatory movement, comprising in combination, a rotary shaft, a reciprocable part, a crank arm on said shaft, a connecting rod pivoted to said reciprocable part and to said crank arm, cam elements on said reciprocable part, and a cam arm associated with and actuated by said shaft for acting on said cam elements at times for assisting said connecting rod in moving said reciprocable part past the axis of said shaft, said connecting rod being the same length as its crank arm and said cam arm being carried by and forming an extension of the crank arm, the cam arm extension being the same length as the crank arm.

5. Means for translating rotary movement into reciprocatory movement, comprising in combination, a first rotary drive shaft, a first reciprocatory carriage, a first crank and first connecting rod arranged between said first shaft and said first carriage for reciprocating said carriage on both sides of the shaft axis, a first cam arm associated with and actuated by said first shaft, and cam means on said first carriage cooperating with said first cam arm for moving said first carriage past center position at the first shaft axis, a second carriage mounted for reciprocatory movement on said first carriage, and means connected to and actuated by said first connecting rod for reciprocating said second carriage when the first carriage is reciprocated.

6. Means for translating rotary movement into reciprocatory movement, comprising in combination, a first rotary drive shaft, a first reciprocatory carriage, a first crank and first connecting rod arranged between said first shaft and said first carriage for reciprocating said carriage on both sides of the shaft axis, a first cam arm associated with and actuated by said first shaft, and cam means on said first carriage cooperating with said first cam arm for moving said first carriage past center position at the first shaft axis, a second carriage mounted for reciprocatory movement on said first carriage, and means connected to and actuated by said first connecting rod for reciprocating said second carriage when the first carriage is reciprocated, said last-mentioned means for reciprocating said second carriage comprising cam means between a rotary part carried on said first carriage and cam elements on said second carriage.

7. Means for translating rotary movement into reciprocatory movement, comprising in combination, a first rotary drive shaft, a first reciprocatory carriage, a first crank and first connecting rod arranged between said first shaft and said first carriage for reciprocating said carriage on both sides of the shaft axis, a first cam arm associated with and actuated by said first shaft, and cam means on said first carriage cooperating with said first cam arm for moving said first carriage past center position at the first shaft axis, a second carriage mounted for reciprocatory movement on said first carriage, and means connected to and actuated by said first connecting rod for reciprocating said second carriage when the first carriage is reciprocated, said last-mentioned means for reciprocating said second carriage comprising a second drive shaft on said first carriage which is rigid with and turned by said first connecting rod, and a second crank arm, connecting rod and cam means driven by said second drive shaft for actuating said second carriage in the manner in which said first carriage is actuated.

8. Means for translating rotary movement into reciprocatory movement, comprising in combination, a first track, a first carriage movable along said track, a first rotary driving crank shaft, a rotary cam element and a crank arm carried by said crank shaft, a connecting rod pivotally connected to said crank arm and said carriage for reciprocating said carriage by the turning of said first crank shaft, means carried by said first carriage which is engaged by the rotary cam element to move said carriage past center position at said crank shaft axis, the crank arm and connecting rod being of such length and the pivot connection of said rod to said carriage being such as to permit the carriage to move past said crank shaft axis in its reciprocatory movement, a track on said first carriage, a second carriage mounted for reciprocatory movement on said first carriage, a second crank shaft on said first carriage constituting the pivot connection between said carriage and its actuating connecting rod, the connecting rod being rigid with said second crank shaft, and a cam element and crank arm and connecting rod between said second crank shaft and said second carriage for reciprocating the second carriage by turning movement of said second and first crank shafts, the mounting and connections of said second carriage providing movement past said crank shaft axes whereby the second carriage is reciprocated through a stroke of greater length than said first carriage.

9. Means for translating rotary movement into reciprocatory movement, comprising in combination, a first track, a first carriage movable along said track, a first rotary driving crank shaft, a rotary cam element and a crank arm carried by said crank shaft, a connecting rod pivotally connected to said crank arm and said carriage for reciprocating said carriage by the turning of said first crank shaft, means carried by said first carriage which is engaged by the rotary cam element to move said carriage past center position at said crank shaft axis, the crank arm and connecting rod being of such length and the pivot connection of said rod to said carriage being such as to permit the carriage to move past said crank shaft axis in its reciprocatory movement, a track on said first carriage, a second carriage mounted for reciprocatory movement on said first carriage, a second crank shaft on said first carriage constituting the pivot connection between said carriage and its actuating connecting rod, the connecting rod being rigid with said second crank shaft, and a cam element and crank arm and connecting rod between said second crank shaft and said second carriage for reciprocating the second carriage by turning movement of said second and first crank shafts, the mounting and connections of said second carriage providing movement past said crank shaft axes whereby the second carriage is reciprocated through a stroke of greater length than said first carriage, said second carriage carrying tracks and having a carriage supported upon its tracks and actuated from the connecting rod of the second carriage by like means and like manner as the second carriage is reciprocated on the first carriage.

10. Means for translating rotary movement into reciprocating movement, comprising in combination, a first carriage, a first way along which said carriage reciprocates, a first carriage reciprocating mechanism including a first rotary crank shaft, a crank arm and connecting rod and rotary cam element for reciprocating said carriage by rotary movement of said first crank shaft past the axis of said first crank shaft, the cam element and connecting rod driving the carriage conjointly at certain times and carrying it under power past central position at the crank shaft axis, a second way on said first carriage, a second carriage mounted on said second way, and driving mechanism for said second carriage driven from the connecting rod of the first carriage and including a second crank shaft rigid with the first connecting rod, a second crank arm and connecting rod and a second rotary cam element for reciprocating said second carriage on the first carriage when the first carriage is reciprocated, the second carriage having movement past said crank shaft axes which coincides at mid-stroke and the second cam means moving the second carriage under power past mid-stroke position.

11. Means for translating rotary movement into reciprocating movement, comprising in combination, a first carriage, a first way along which said carriage reciprocates, a first carriage reciprocating mechanism including a first rotary crank shaft, a crank arm and connecting rod and rotary cam element for reciprocating said carriage by rotary movement of said first crank shaft past the axis of said first crank shaft, the cam element and connecting rod driving the carriage conjointly at certain times and carrying it under power past central position at the crank shaft axis, a second way on said first carriage, a second carriage mounted on said second way, and driving mechanism for said second carriage driven from the connecting rod of the first carriage and including a second crank shaft rigid with the first connecting rod, a second crank arm and connecting rod and a second rotary cam element for reciprocating said second carriage on the first carriage when the first carriage is reciprocated, the second carriage having movement past said crank shaft axes which coincide at mid-stroke and the second cam means moving the second carriage under power past mid-stroke position, in each carriage reciprocating mechanism the crank arm and connecting rod being of the same length and the rotary cam element being carried at a radius which is twice the length of said crank arm, for the purposes set forth.

12. Means for translating rotary movement into reciprocatory movement, comprising in combination, a rotary drive shaft, a reciprocatory carriage mounted for movement past said drive shaft axis as a center, drive means between said drive shaft and carriage for reciprocating the carriage as the shaft rotates, said drive means comprising a crank arm and connecting rod and cam means for moving the carriage at center position past said shaft axis, and means included in said drive means for causing the movement of said carriage to depart at times from the simple harmonic motion normally produced by said drive shaft.

13. Means for translating rotary movement into reciprocatory movement, comprising in combination, a rotary drive shaft, a reciprocatory carriage mounted for movement past said drive shaft axis as a center, drive means between said drive shaft and carriage for reciprocating the carriage as the shaft rotates, said drive means comprising a crank arm and connecting rod and cam means for moving the carriage at center position past said shaft axis, and means included in said drive means for causing the movement of said carriage to depart at times from the simple harmonic motion normally produced by said drive shaft, said movement altering means comprising means for changing the angular rate of movement of said crank arm at times.

14. Means for translating rotary movement into reciprocatory movement, comprising in combination, a rotary drive shaft, a reciprocatory carriage mounted for movement past said drive shaft axis as a center, drive means between said drive shaft and carriage for reciprocating the carriage as the shaft rotates, said drive means comprising a crank arm and connecting rod and cam means for moving the carriage at center position past said shaft axis, and means included in said drive means for causing the movement of said carriage to depart at times from the simple harmonic motion normally produced by said drive shaft, said movement altering means comprising means for changing the length of travel of the carriage.

15. Means for translating rotary movement into reciprocatory movement, comprising in combination, a rotary drive shaft, a reciprocatory carriage mounted for movement past said drive shaft axis as a center, drive means between said drive shaft and carriage for reciprocating the carriage as the shaft rotates, said drive means comprising a crank arm and connecting rod and cam means for moving the carriage at center position past said shaft axis, and means included in said drive means for causing the movement of said carriage to depart at times from the simple harmonic motion normally produced by said drive shaft, said movement altering means comprising means for changing the angular rate of movement of said crank arm and for changing the length of travel of the carriage.

16. Means for translating rotary movement into reciprocatory movement, comprising in combination, a rotary drive shaft, a reciprocatory carriage mounted for movement past said drive shaft axis as a center, drive means between said drive shaft and carriage for reciprocating the carriage as the shaft rotates, said drive means comprising a crank arm and connecting rod and cam means for moving the carriage at center position past said shaft axis, and means included in said drive means for causing the movement of said carriage to depart at times from the simple harmonic motion normally produced by said drive shaft, said movement altering means comprising a connecting rod and cam means between said drive shaft and said crank arm for changing the angular rate of movement of said crank arm at times.

17. Means for translating rotary movement into reciprocatory movement, comprising in combination, a rotary drive shaft, a reciprocatory carriage mounted for movement past said drive shaft axis as a center, drive means between said drive shaft and carriage for reciprocating the carriage as the shaft rotates, said drive means comprising a crank arm and connecting rod and cam means for moving the carriage at center position past said shaft axis, and means included in said drive means for causing the movement of said carriage to depart at times from the simple harmonic motion normally produced by said drive shaft, said movement altering means comprising a shiftable connection including a cam between said crank arm and connecting rod for changing the length of travel of the carriage.

18. Means for translating rotary movement into reciprocatory movement comprising in combination, a rotary drive shaft, a carriage mounted for reciprocatory movement past the axis of said drive shaft, drive means including a crank arm and connecting rod and cam means for moving the carriage past the shaft axis position, and means for adjusting the length of travel of said carriage.

19. Means for translating rotary movement into reciprocating movement, comprising in combination, a reciprocable member, a rotary shaft, a rotary crank arm carried by said shaft, a connecting rod pivoted to said reciprocable member and to said crank arm, the reciprocable member being mounted for movement past the axis of said rotary shaft, said crank arm and connecting rod being of suitable lengths to permit the reciprocable member to move past the shaft axis, the crank arm and connecting rod providing movement and control of the reciprocable member near the ends of its stroke, but being ineffective to drive or control the movements of the reciprocable member when it is near the mid-point of its stroke, and cam operating means operated through said shaft for positively moving said reciprocable member past center position.

No references cited.